United States Patent
Feigen

(10) Patent No.: US 8,504,643 B2
(45) Date of Patent: Aug. 6, 2013

(54) SYSTEM AND METHOD FOR UNIFORM DISTRIBUTED DESTINATIONS

(75) Inventor: Lawrence Feigen, Watchung, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 1191 days.

(21) Appl. No.: 11/416,862

(22) Filed: May 2, 2006

(65) Prior Publication Data

US 2007/0277181 A1    Nov. 29, 2007

(51) Int. Cl.
*G06F 15/16* (2006.01)
*G06F 15/177* (2006.01)

(52) U.S. Cl.
USPC .......................................... 709/217; 709/220

(58) Field of Classification Search
USPC ................................................ 709/217, 220
See application file for complete search history.

(56) References Cited

U.S. PATENT DOCUMENTS

| | | | |
|---|---|---|---|
| 6,226,649 B1 * | 5/2001 | Bodamer et al. | 709/203 |
| 6,691,165 B1 * | 2/2004 | Bruck et al. | 709/227 |
| 7,222,148 B2 * | 5/2007 | Potter et al. | 709/201 |
| 2003/0105800 A1 * | 6/2003 | Cullen | 709/201 |
| 2004/0153558 A1 * | 8/2004 | Gunduc et al. | 709/229 |
| 2004/0267911 A1 * | 12/2004 | Alam | 709/220 |
| 2005/0240654 A1 * | 10/2005 | Wolber et al. | 709/206 |
| 2007/0143454 A1 * | 6/2007 | Ma et al. | 709/222 |

\* cited by examiner

*Primary Examiner* — Lynn Feild
*Assistant Examiner* — Lin Liu
(74) *Attorney, Agent, or Firm* — Fliesler Meyer LLP

(57) ABSTRACT

The present invention enables enable uniform distributed destination, which greatly simplifies the management and development of distributed destination applications and permits the configuration of a clustered resource to be adjusted dynamically to meet the changing configuration of the cluster. In a uniform distributed destination, member destinations will be allocated uniformly, each having a consistent configuration of all distributed destination parameters. This description is not intended to be a complete description of, or limit the scope of, the invention. Other features, aspects, and objects of the invention can be obtained from a review of the specification, the figures, and the claims.

20 Claims, 2 Drawing Sheets

SYSTEM AND METHOD FOR UNIFORM DISTRIBUTED DESTINATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of management of distributed destinations for messaging services.

BACKGROUND

A destination object can be either a queue or topic, which are software components (applications) structured to encapsulate address syntax for a specific provider. A distributed destination is a set of destinations (queues or topics) that are accessible as a single, logical destination to a client and can have the following characteristics:
  It is referenced by its own Java Naming and Directory Interface (JNDI) name, which is part of the Java platform, providing applications based on Java technology with a unified interface to multiple naming and directory services.
  Members of the set are usually distributed across multiple servers within a cluster, with each destination member belonging to a separate server, which for a non-limiting example, can be a Java Messaging Service (JMS) server.

Distributed destinations provide customers with higher availability and greater scalability for applications such as JMS queues and topics than simple destinations because they can provide load balancing and failover for member destinations of a distributed destination within a cluster. Once properly configured, your producers and consumers are able to send and receive messages through the distributed destination. A Web or JMS server then balances the messaging load across all available members of the distributed destination. When one member destination becomes unavailable due to a server failure, traffic is then redirected toward other available destination members in the set.

Heterogeneous distributed destinations, however, can be harder to configure and maintain than necessary. In order to create a distributed destination, the administrator or application packager needs to manually create and configure physical destinations first before they can function as members of the distributed destination. Although his approach provides the flexibility to create individual members that are intended to carry extra message load or have extra capacity and with a load balancing policy that matches the capacity, such differences often lead to administrative and application problems because such a weighted distributed destination was not deployed consistently across a cluster. Furthermore, certain properties of the member destinations must be made uniform in order to function properly. For a non-limiting example, if there are two members which have different security restrictions, the same user may connect to the same destination twice and once be allowed to send messages while another time be forbidden to do so.

SUMMARY OF THE INVENTION

The present invention enables enable uniform distributed destination, which greatly simplifies the management and development of distributed destination applications and permits the configuration of a clustered resource to be adjusted dynamically to meet the changing configuration of the cluster. In a uniform distributed destination, member destinations will be allocated uniformly, each having a consistent configuration of all distributed destination parameters.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Various embodiments of the present invention enable a new type of distributed destination, uniform distributed destination, which greatly simplifies the management and development of distributed destination applications. With uniform distributed destination, the members are unspecified but are created by the administrator. In a uniform distributed destination, member destinations will be allocated uniformly, each having a consistent configuration of all distributed destination parameters, particularly in regards to weighting, security, persistence, paging, and quotas. Such an approach permits the configuration of a clustered resource (members) to be adjusted automatically to meet the changing configuration of the cluster. Furthermore, not only new destinations can be added as the configuration grows, but also the beans, for a non-limiting example, Message Driven Beans (MDBs) configured to consume messages from the distributed destination, can have more deployments created to match the growth in the destination configuration.

Figure 1:
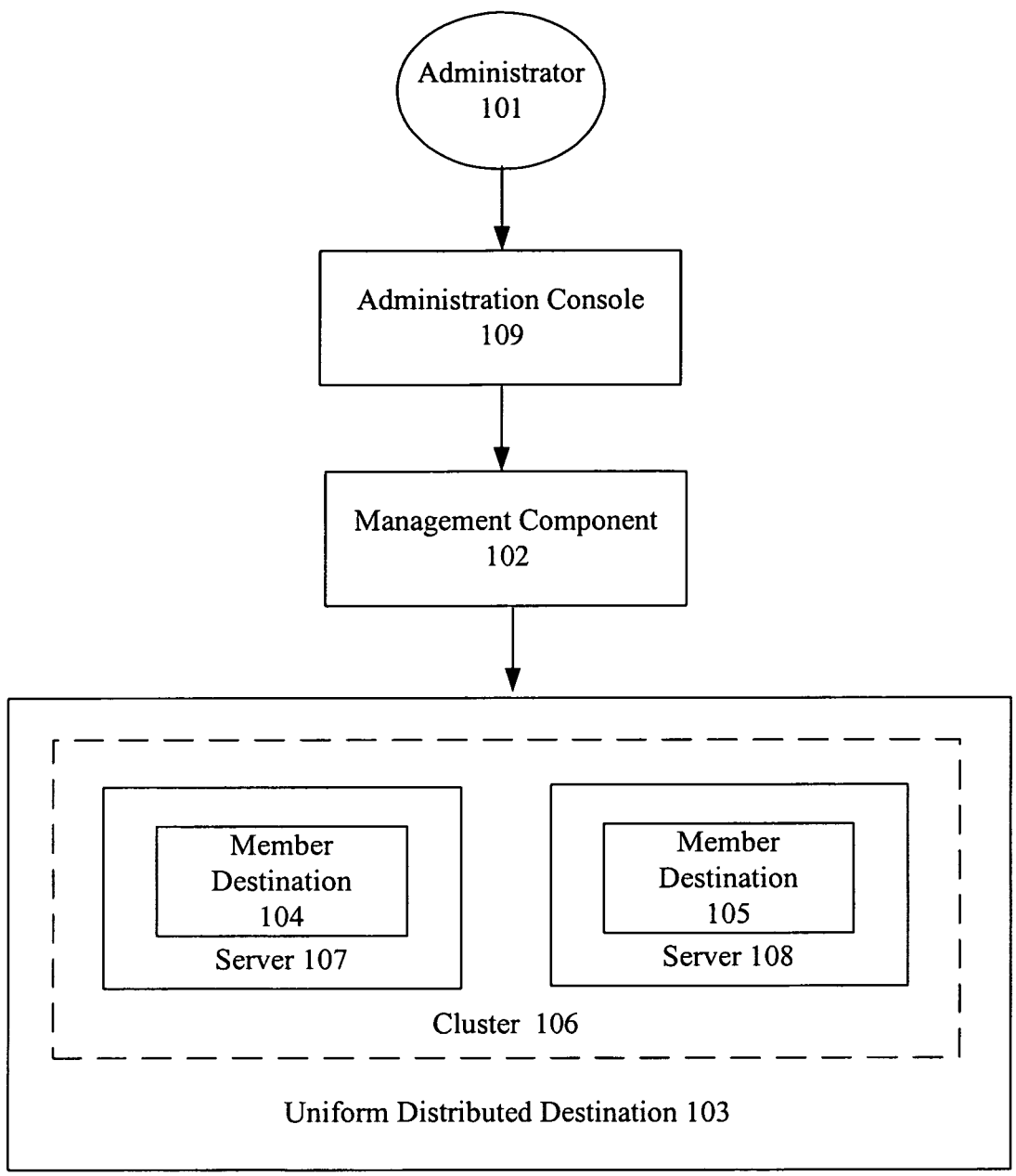
FIG. 1 is an illustration of an exemplary system for uniform distributed destination in one embodiment of the present invention.

FIG. 1 is an illustration of an exemplary system for uniform distributed destination in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, a uniform distributed destination 103 can be designated by an administrator 101 to be accessible as one single, logical destination for use applications. The uniform distributed destination comprises of a plurality of member destinations 104 and 105, which can be created automatically by management component 102 without manual intervention from the administrator. The management component 102 can further configure the member destinations with a plurality of consistent distributed destination parameters. The member destinations can be targeted at a cluster 106 or one or more servers 107 and 108, each can be a JMS server or a Web server. The management component 102 can also add or remove the member destinations dynamically as the configuration of the cluster changes, i.e., servers are added or removed from the cluster.

In some embodiments, an administration console 109 enables the administrator to configure, modify, target, and delete uniform distributed destination resources (members) by choosing certain options on a GUI via the management component. The management component then automatically creates uniformly-configured destination members on selected or on all servers on a target machine or cluster. The default is to configure a cluster-wide destination. Some uniform distributed destination options are dynamically configurable by the administrator. When the options are modified at run time, only incoming messages are affected while stored messages are not affected on JMS servers.

Figure 2:
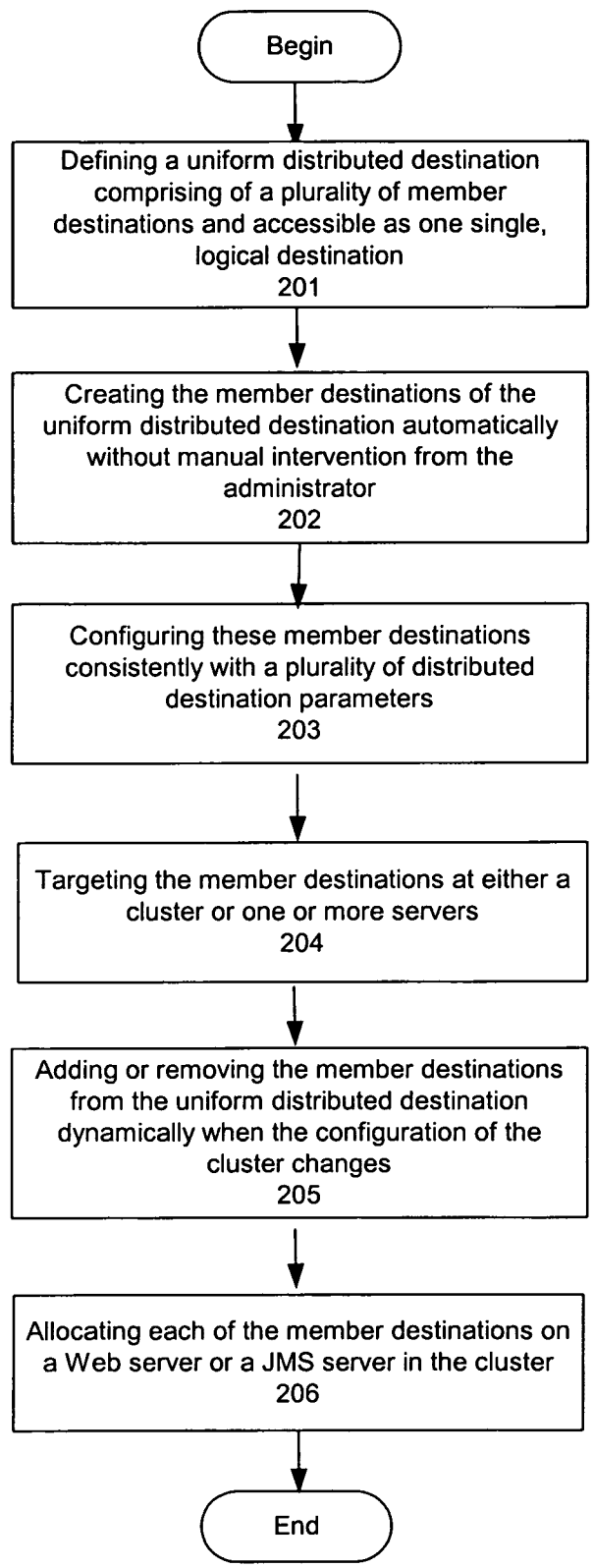
FIG. 2 is a flow chart illustrating an exemplary process for uniform distributed destination in accordance with one embodiment of the invention.

FIG. 2 is a flow chart illustrating an exemplary process for uniform distributed destination in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, a uniform distributed destination comprising of a plurality of member destinations and accessible as one single, logical destination can be defined at step 201. The member destinations of the uniform distributed destination can then be created automatically without manual intervention from the administrator at step 202. These member destinations can be configured consistently with a plurality of distributed destination parameters at step 203, and targeted at either a cluster or one or more servers at step 204. At step 205, the member destinations can be added or removed from the uniform distributed destination dynamically when the configuration of the cluster changes, and each of them can be allocated on a Web server or a JMS server in the cluster at step 206.

In some embodiments, the management component can access a uniform destination member within a uniform distributed destination by looking up the JNDI name or the member name using APIs of JMS modules. For a non-limiting example, the following code illustrates how to look up a particular member of a uniform distributed queue (myQueue) on a JMS server (myServer) in module (myModule):

queue=myQueueSession.createQueue("myModule!myServer/myQueue");

Here, any string containing a forward slash (/), is assumed to be the name of a distributed destination member—not a distributed destination when calling the createQueue( ) or createTopic( ) methods are called. If no such destination member exists, then the call will fail with an InvalidDestinationException.

In some embodiments, a uniform distributed destination can be configured and deployed as part of a JMS module in the administration console. The JMS module schema can be modified in order to support this feature.

In some embodiments, unlike standalone queues and topics that can only be deployed to a specific server in a domain, uniform distributed destinations can be targeted to a cluster or one or more Web servers or JMS servers. The purpose of uniform distributed destinations is to distribute its members on every server in a domain. It provides dynamic updating when a new member is added to or a member is removed from a cluster. A user no longer needs to create or designate destination members, but instead rely on the system to uniformly create and configure the necessary members on the servers (cluster) to which the uniform distributed destination is targeted. For a non-limiting example, if a uniform distributed destination is targeted to a cluster, there is a member of the uniform distributed destination on every server in the cluster. If a new server is added, a new member is dynamically added to the uniform distributed destination. Likewise, if a server is removed, the corresponding member is removed from the uniform distributed destination. This allows the uniform distributed destination to provide higher availability by eliminating bottlenecks caused by configuration errors. If a new server is created in the cluster, a member will be created on that server. Similarly, when a uniform distributed destination is targeted to a Web server, it will have all members targeted to that Web server. If a new (JMS) server is created on that Web server, a member will be created on that server. On the other hand, changing the targets of a uniform distributed destination can lead to the removal of a member destination and the unintentional loss of messages.

In some embodiments, when the management component changes the targeting of a uniform distributed destination from cluster-wide to a list of servers, some of the servers may not be on that list. Therefore, some of the members previously allocated to those servers will no longer be reachable through the distributed destination mechanism. This problem can be addressed by keeping these members around so that they may later be accessed and included in another uniform distributed destination by the administrator. In the meantime, these now "detached" members should be treated as destinations and appear in the list of destinations for the server on administration console.

In some embodiments, a member can have a name that matches the one to be generated by the uniform distributed destination because of the retargeting scenario described above. In this case, the creation operation should not fail, but instead make the destination part of the distributed destination again.

In some embodiments, it is preferable to allocate a member on each Web server in the cluster, rather than each JMS server in the cluster. There are two sub-cases with different explanations: the case where there is no JMS server on a particular cluster member and the case where there is more than one JMS server on a particular member. The first case comes up most often when creating a new Web service server, rather than creating a new distributed destination. It would be useful if there were a feature where a JMS server was created automatically when a new Web server was created. However, this should be handled as a separate process, rather than building this feature as a side effect of the design of distributed destinations. In order to understand the second case, one needs to understand why someone would put more than one JMS server on a particular Web server under the following scenarios:

The person setting up these multiple JMS server on the same Web server in order to improve the performance of JMS. In such a case, the person would concern about the allocation of resources and would be interested solely in heterogeneous distributed destinations which afford more fine-grained control.

There are "uniform" JMS servers, one on each Web server and all are part of a same application which adds one JMS server to one cluster member with a unique quota, unique store, etc. In this case, the administrator really wants the uniform distributed destination to be on all of the JMS servers, except the exceptional one.

This looks exactly the same as the previous one, except that all of the JMS servers (including the exceptional one) are part of the same jar and that the "uniform" ones are not 100% identical. Again, the administrator would want to just use the "uniform" JMS servers for the uniform distributed destinations.

The cluster contains a mix of JMS servers and Web servers. There are various reasons for the existence of multiple JMS servers. In this case, it is impossible for the JMS software to guess which one to use.

All these scenarios seem to lead to the logic that the administrator should put a member on each JMS server whenever feasible.

In some embodiments, there will often be heterogeneous distributed destinations in an existing installation of Web server that look like uniform ones when the installation is being upgraded. For a non-limiting example, there may be a heterogeneous distributed destination that has members on each JMS server in the cluster, with no weighting and where each member has identical properties (same type of store, same quota, etc.). In such a case, the person doing an interactive upgrade should be given the option of converting the destination to a uniform distributed destination instead of merely carrying forward the heterogeneous distributed destination that is not heterogeneous at all. Furthermore, the option of a "Yes to All" should be presented as well—in which the administrator indicates that all heterogeneous distributed destinations that "look like" uniform distributed destinations should be converted to such.

In some embodiments, message operations such as message production, insertion, and/or consumption operations on a uniform distributed destination can be paused and/or resumed either programmatically (using API of runtime beans) or administratively (using the Administration Console). This allows an administrator to control a JMS subsystem's behavior in the event of an external resource failure that would otherwise cause the JMS subsystem to overload the system by continuously accepting and delivering (and redelivering) messages.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "destination" is used in the embodiments of the systems and methods described above, it will be evident that such concept can be interchangeably used with equivalent concepts such as, class, method, type, interface, component, object model, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to support messaging services for a cluster of servers, comprising:
    one or more microprocessors;
    a uniform distributed destination component that is associated with the cluster of servers and is accessible as one single, logical destination that operates to receive one or more messages from a plurality of producers outside of the cluster of servers and provide the one or more messages to a plurality of consumers outside of the cluster of servers, wherein the uniform distributed destination component includes a plurality of member destinations, wherein each of said plurality of member destination is a message queue that is configured using a plurality of consistent distributed destination parameters, and wherein the uniform distributed destination component maintains at least one member destination on each server of the cluster of servers, and operates to automatically specify one or more said member destinations to handle the one or more messages; and
    a managing component, running on the one or more microprocessors, that operates to convert a group of heterogeneous distributed destinations existing in the cluster of servers into the uniform distributed destination component, when the managing component detects that each heterogeneous distributed destination was manually set up on the cluster of servers with identical distributed destination parameters, and wherein for each said member destination in the uniform distributed destination component is configured based on the identical distributed destination parameters for the heterogeneous distributed destinations, and
    wherein the managing component automatically adds a new member destination, which is a message queue, in the uniform distributed destination component, when a new messaging server is added on the server in the cluster of servers, wherein the message queue is configured based on said plurality of consistent distributed destination parameters, and wherein the new member destination becomes a part of the uniform distributed destination component and is accessible along with other member destinations in the uniform distributed destination component as one single, logical destination.

2. The system according to claim 1, further comprising: an administration console operable to enable an administrator to manage the uniform distributed destination component via the managing component.

3. The system according to claim 1, wherein: each of the plurality of member destinations can be one of a queue, topic, and a bean.

4. The system according to claim 1, wherein: each of the plurality of consistent distributed destination parameters can be one of weighting, security, persistence, paging, and quotas.

5. The system according to claim 1, wherein: each server in the cluster of servers can be a messaging service server or a web server.

6. The system according to claim 5, wherein: the managing component is further operable to allocate each of the plurality of member destinations on a web server or a messaging server in the cluster.

7. The system according to claim 1, wherein: the managing component is further operable to perform:
   referencing the uniform distributed destination component by its name; and
   accessing a member destination in the plurality of member destinations by looking up the name of the member and/or the destination.

8. The system according to claim 1, wherein: the managing component is further operable to pause and/or resume a message operation on the uniform distributed destination component either programmatically or administratively.

9. The system according to claim 1, wherein: the managing component can further perform
   retargeting the uniform distributed destination component from the cluster of servers to a list of servers, wherein at least one server in the cluster is not on the list;
   detaching one or more destinations that correspond to the at least one server from the distributed destination; and
   including the one or more destinations in another distributed destination.

10. The system according to claim 1, wherein: each said server in the cluster of servers is a web server, and at least one said web server has more than one messaging server.

11. The system according to claim 10, wherein: the managing component automatically create a member destination in the uniform distributed destination component for each said messaging server on the at least one said web server.

12. The system according to claim 10, wherein: the managing component automatically create one member destination for the at least one said web server, wherein the one member destination serves all said messaging servers on the at least one said web server.

13. The system according to claim 1, wherein: the managing component operates to deploy or undeploy one or more message driven software applications to match an addition or a reduction of a member destination in the uniform distributed destination component, wherein said one or more message driven software applications are configured to consume messages from the uniform distributed destination component.

14. A computer-implemented method to support messaging services, comprising:
   defining a uniform distributed destination component that is associated with a cluster of servers and is accessible as one single, logical destination that operates to receive one or more messages from a plurality of producers outside of the cluster of servers and provide the one or more messages to a plurality of consumers outside of the cluster of servers, wherein the uniform distributed destination component includes a plurality of member destinations, wherein each of said plurality of member destination is a message queue that is configured using a plurality of consistent distributed destination parameters, and wherein the uniform distributed destination component maintains at least one member destination on each server of the cluster of servers, and operates to automatically specify one or more said member destinations to handle the one or more messages; and
   converting a group of heterogeneous distributed destinations existing in the cluster of servers into the uniform distributed destination component, when the managing component detects that each heterogeneous distributed destination was manually set up on the cluster of servers with identical distributed destination parameters, and wherein each said member destination in the uniform distributed destination component is configured based on the identical distributed destination parameters for said heterogeneous distributed destinations, and
   automatically adding a new member destination, which is a message queue, in the uniform distributed destination component, when a new messaging server is added on the server in the cluster of servers, wherein the message queue is configured based on said plurality of consistent distributed destination parameters, and wherein the new member destination becomes a part of the uniform distributed destination component and is accessible along with other member destinations in the uniform distributed destination component as one single, logical destination.

15. The method according to claim 14, further comprising: enabling an administrator to manage the uniform distributed destination component.

16. The method according to claim 14, further comprising: allocating each of the plurality of member destinations on a web server or a JMS server in the cluster.

17. The method according to claim 16, further comprising:
   referencing the uniform distributed destination component by its name; and
   accessing a member destination in the plurality of member destinations by looking up the name of the member and/or the destination.

18. The method according to claim 14, further comprising: pausing and/or resuming a message operation on the uniform distributed destination component either programmatically or administratively.

19. A non-transitory machine readable medium comprising instructions stored thereon that when executed cause a system to:
   define a uniform distributed destination component that is associated with a cluster of servers and is accessible as one single, logical destination that operates to receive one or more messages from a plurality of producers outside of the cluster of servers and provide the one or more messages to a plurality of consumers outside of the cluster of servers, wherein the uniform distributed destination component includes a plurality of member destinations, wherein each of said plurality of member destination is a message queue that is configured using a plurality of consistent distributed destination parameters, and wherein the uniform distributed destination component maintains at least one member destination on each server of the cluster of servers, and operates to automatically specify one or more said member destinations to handle the one or more messages; and
   convert a group of heterogeneous distributed destinations existing in the cluster of servers into the uniform distributed destination component, when the managing component detects that each heterogeneous distributed destination was manually set up on the cluster of servers with identical distributed destination parameters, and wherein each said member destination in the uniform distributed destination component is configured based on the identical distributed destination parameters for said heterogeneous distributed destinations, and wherein the managing component automatically adds a new member destination, which is a message queue, in the uniform distributed destination component, when a new messaging server is added on the server in the cluster of servers, wherein the message queue is configured based on said plurality of consistent distributed destination parameters, and wherein the new member destination becomes a part of the uniform distributed destination component and is accessible along with other member destinations in the uniform distributed destination component as one single, logical destination.

20. A system to support messaging services, comprising:
one or more microprocessors;
a uniform distributed destination component that handles messaging for a plurality of messaging servers on a cluster of web servers and is accessible as one single, logical destination that operates to receive one or more messages from a plurality of producers outside of the cluster of web servers and provide the one or more messages to a plurality of consumers outside of the cluster of web servers, wherein the uniform distributed destination component includes a plurality of member destinations, wherein each of said plurality of member destination is a message queue that is configured using a plurality of consistent distributed destination parameters, wherein at least one web server is set up with multiple said messaging servers, and wherein the uniform distributed destination component operates to automatically specify one or more said member destinations to handle the one or more messages; and a managing component, running on the one or more processors, that operates to target the uniform distributed destination component for the plurality of messaging servers on the cluster of web servers, wherein the managing component automatically creates, configures and maintains at least one member destination on each messaging server on the cluster of web servers based on the plurality of consistent distributed destination parameters, and wherein the managing component automatically adds a new member destination, which is a message queue, in the uniform distributed destination component, when a new messaging server is added on a web server in the cluster of web servers, wherein the message queue is configured based on said plurality of consistent distributed destination parameters, and wherein the new member destination becomes a part of the uniform distributed destination component and is accessible along with other member destinations in the uniform distributed destination component as one single, logical destination; and automatically removes one or more corresponding member destinations from the uniform distributed destination component when a messaging server on the at least one web server in the cluster of web servers is removed.

* * * * *